Nov. 11, 1947.   W. M. PAUL   2,430,825
SPEED INDICATING APPARATUS
Filed Oct. 8, 1945
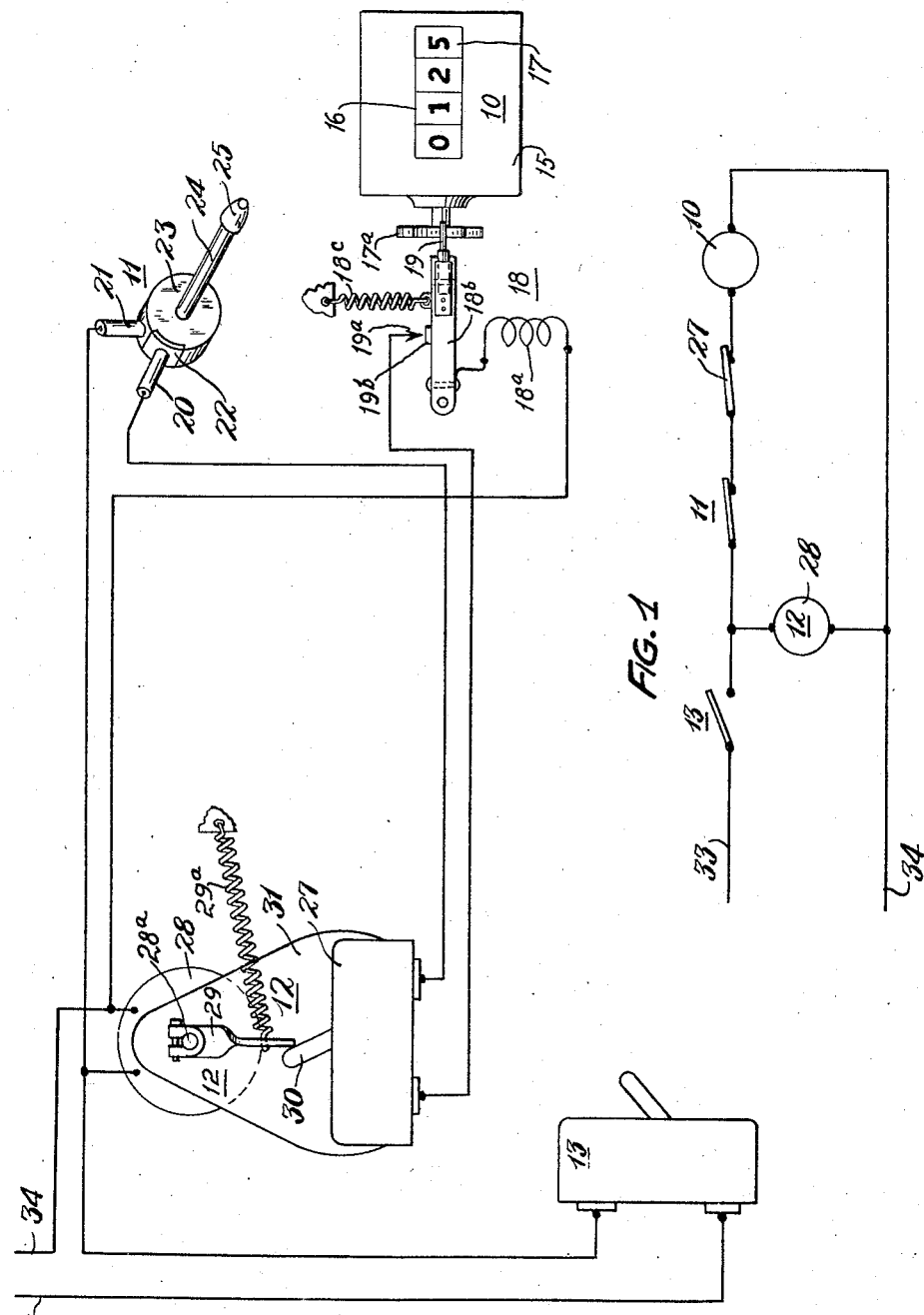
INVENTOR.
WILLIAM M. PAUL
BY
Kivis Hudson Boughton & Williams
ATTORNEYS Patented Nov. 11, 1947

2,430,825

UNITED STATES PATENT OFFICE 2,430,825

SPEED INDICATING APPARATUS

William M. Paul, Mentor-on-the-Lake, Ohio, assignor to Designers For Industry, Inc., Cleveland, Ohio, a corporation of Ohio Application October 8, 1945, Serial No. 620,897

2 Claims. (Cl. 235—104)

This invention has to do with speed counting for rotary shafts and devices and, as one of its objects, aims to provide a simple and practical apparatus for quickly and accurately determining the R. P. M. of such rotating members.

Another object of this invention is to provide an improved apparatus for determining the speed of a rotating member and involving the use of an electric revolution counter which is operated during a predetermined time interval.

A further object of this invention is to provide an improved apparatus for determining the speed of a rotating member and involving the use of an electric revolution counter which is operated during a predetermined time interval, after which the R. P. M. of the rotating member is computed from the revolution count and the time interval.

Still another object is to provide improved speed counting apparatus of this character, in which the revolution counter is actuated by electric impulses from an intermittently closing switch device adapted to be manually carried to and connected with the rotating member and which transmits such impulses during a predetermined time interval.

Yet another object is to provide an improved speed counting apparatus of the character mentioned, in which the time interval is determined by a timing device of the synchronous motor type.

The invention can be further briefly summarized as consisting in certain novel combinations and arrangements of parts hereinafter described in detail and particularly set out in the appended claims.

In the accompanying sheet of drawings:

Fig. 1 is a diagrammatic view showing speed counting apparatus embodying the present invention, and Fig. 2 is a schematic wiring diagram for the apparatus.

As shown in Fig. 1 of the drawings the improved speed counting apparatus includes an electric or magnetic counter 10, a rotary switch device 11 and a timing device 12. The apparatus also includes a manually operable control switch 13 for starting the apparatus.

The electric counter 10 may be any suitable form of known device of this kind which can be connected in an electric circuit and which will operate to count and visibly indicate the revolutions of a shaft or other rotating member to which the speed counting apparatus is applied. The device 10 is here shown as having a housing 15 provided with an opening or window 16 through which movable indicia 17 are visible for indicating the revolution count. This device also includes electromagnetic means 18 which, when suitably energized, operates to cause a step-by-step shifting of the indicia 17 in a manner well understood in revolution counters and other indicating devices of this character. The electromagnet 18 is here shown as comprising a magnet coil 18a and a movable armature 18b which is actuated by the coil in opposition to a tension spring 18c. The armature 18b has a yieldable finger 19 thereon which drivingly engages the star wheel 17a. The electromagnet also includes a pair of electric contacts 19a and 19b which are opened and closed by the movements of the armature 18b.

The switch device 11 embodies an intermittently closing switch comprising a pair of stationary contacts or brushes 20 and 21 and a movable contact 22 for bridging and closing the stationary contacts. The switch device 11 also includes a rotatable body 23 of electric insulating material which carries the moving contact 22 and is connected with a shaft or spindle 24. The outer end of the shaft 24 is provided with a connecting means 25 preferably in the form of a friction element such as a soft rubber tip.

It will be understood, of course, that the elements just enumerated for the rotary switch device 11 will be contained in a suitable housing in which the body 23 and the shaft 24 will be rotatably mounted with the connecting means 25 projecting from such housing. This rotary switch device can be permanently connected with a shaft or other rotary member whose speed is to be counted but, preferably, it is only temporarily connected with such shaft or member by holding the friction tip 25 thereagainst so that the shaft 24 and body 23 will be driven at the same rate as the shaft or member whose speed is to be counted. As will be further explained hereinafter, the switch device 11 supplies electric impulses to the counter 10 to actuate the latter.

The timing device 12 comprises a normally closed switch 27 and an electric motor 28 operably connected with the switch so as to cause the same to be opened upon the termination of a predetermined time interval. The timing device 12 may be any known device of this character embodying means by which it can be set for a desired time interval and a switch which will be automatically actuated upon the lapse of such predetermined time interval. The motor 28 is preferably a synchronous motor so that when energized from the power line it will operate to measure the desired time interval in the manner of the synchronous motors used in electric clocks. In this instance the motor 28 drives a shaft 28a with which it is connected by suitable transmission mechanism contained in the housing 31, and an actuating arm 29 which is engageable with the arm or tumbler 30 of the switch 27 is mounted on the shaft 28a. When the timing device has been set for a desired time interval and the motor 28 is energized by closing of the switch 13, the motor will run at its synchronous speed and upon the lapse of the time interval the arm 29 will be swung in a direction to engage and shift the tumbler 30 so as to open the switch 27. When the motor 28 is deenergized, as by opening of the switch 13, a spring 29a return or resets the arm 29 by swinging the same in the opposite direction thereby permitting the tumbler 30 to be shifted to the position corresponding with the normally closed condition of the switch 27.

As illustrated in the drawing, an energizing circuit is provided for connecting the devices 10, 11 and 12 in operative relation to each other. This energizing circuit is also connected with a source of electric current which is here represented by the line conductors 33 and 34 and which may be a source of 110 volt 60 cycle alternating current. The energizing circuit for the apparatus also includes the above mentioned control switch 13 to which further reference will presently be made.

As is indicated in the schematic wiring diagram of Fig. 2, the energizing circuit is such that the electric counting device 10 is connected with the line conductors 33 and 34 through the contacts of the rotary switch device 11 and through the contacts of the switch 27 of the timing device 12. The electric motor 28 of the timing device 12 is connected across the line conductors 33 and 34 so that it can be energized therefrom. The manually operable control switch 13 is located in the energizing circuit at a point between the line conductors and the timing device 12 and controls the supply of electric current to the motor of the timing device and to the electric counter 10. As mentioned above, the switch 13 controls the starting of the apparatus because even though the switch device 11 is being driven, the counter 10 will not operate unless the switch 13 is closed. Likewise, the timing device 12 starts to operate to measure the predetermined time interval only upon the closing of the switch 13. The switch 13 is a normally open switch and after the desired counting operation is completed this switch is opened to deenergize the torque motor 28 and is left in an open condition until the apparatus is to be used again.

In using the apparatus herein disclosed, the rotary switch device 11 is connected with the shaft or rotating member whose speed is to be counted so that this device will be driven at the same speed. The manual control switch 13 is then closed which energizes the motor of the timing device 12 and enables the rotary switch device 11 to transmit current impulses to the electric counter 10. During the counting operation the rotation of the member 23 of the switch device 11 causes the movable contact 22 to intermittently close the energizing circuit for the electric counter 10. Each closing of this circuit by the contact 22 causes an impulse to be supplied to the counter 10 and, in response to these impulses, the indicia 17 will be moved into view in the opening of the window 16 so as to indicate the exact number of revolutions made by the shaft being analyzed.

The rotary switch device 11 continues to operate until the torque motor 28 of the timing device 12 opens the switch 27. The opening of the switch 27 breaks the circuit between the rotary switch device 11 and the electric counter 10 so that even though the rotary switch device continues to operate it will not transmit any further impulses to the counter 10. The reading then given by the indicia 17 of the counter will represent the number of revolutions which have been made by the shaft during the predetermined time interval measured by the timing device 12.

The R. P. M. of the shaft being checked is then determined by computation using the revolution count obtained from the counting device 10 and a constant obtained from the time interval. If the time interval is 6 seconds, the constant will be 10, or $$\frac{60 \text{ seconds}}{6 \text{ seconds}}$$

Similarly, if the time interval is 15 seconds, the constant will be 4 or $$\frac{60 \text{ seconds}}{15 \text{ seconds}}$$

Likewise, if the time interval is 60 seconds or one full minute the constant will be 1. The R. P. M. of the shaft is obtained by multiplying the revolution count by the constant which has been obtained in the manner just explained. For example, if the revolution count is 125 and the constant is 10, the R. P. M. of the shaft will be 1250. It will be noted that the constant used in this computation is really a function of the predetermined time interval expressed in terms of minutes.

The rotary switch device 11 can be permanently connected with the shaft or rotary part whose speed is to be counted, but preferably as mentioned above, is a manually portable device which can be carried to the rotating shaft or device and held thereagainst while the counter 10 and timing device 12 remain in a fixed location. The portion of the energizing circuit represented by the conductors connected with the stationary contacts 20 and 21 is preferably in the form of a flexible conductor cable of a length to permit the rotary switch device 11 to be carried to the shaft or rotary part to be checked. The manual control switch 13 can be located on or adjacent the rotary switch device 11 so as to be conveniently accessible to the operator. The conductors by which the manual switch is connected into the energizing circuit can also be included in the flexible cable.

If desired the rotary switch device 11 may be constructed with a gear train therein of a suitable ratio so as to increase the operating range of the apparatus and decrease the actual operating speed of the switch device 11 and of the counter 10 to a safe value.

From the foregoing description and the accompanying drawing it will now be readily seen that the present invention provides a speed counting apparatus which is both simple and practical and by which the speed of a rotating member can be quickly and accurately determined.

Although the improved speed counting apparatus has been illustrated and described herein in some detail, it will be understood, of course, that the invention is not to be regarded as correspondingly limited but includes all changes and modifications coming within the scope of the appended claims.

Having thus described my invention, I claim:

1. A speed indicating apparatus comprising an electric counting device operable in response to electric impulses supplied thereto, an intermittently closing switch device adapted to be driven by the member whose speed is to be determined, an energizing circuit connecting said switch device with said counting device and enabling the switch device to supply said impulses to said counting device, a time measuring device of the synchronous motor type, a switch in said circuit adapted to be actuated by said time measuring device to cause stopping of said counting device upon the elapse of a predetermined time interval, a current source connected with said circuit and with said time measuring device, and manually operable switch means controlling the energization of said circuit and time measuring device from said current source.

2. A speed indicating apparatus comprising an electric counting device operable in response to electric impulses supplied thereto, an intermittently closing switch device adapted to be driven by the member whose speed is to be determined, an energizing circuit connecting said switch device with said electric counting device and enabling the switch device to supply said impulses to said electric counting device, a time measuring device of the synchronous motor type, a switch in said circuit adapted to be actuated by said time measuring device to cause stopping of said electric counting device upon the elapse of a predetermined time interval, a current source connected with said circuit and with said time measuring device, manually operable switch means controlling the energization of said circuit and time measuring device from said current source, said intermittently closing switch device and said manually operable switch means constituting a manually portable unit, and a flexible conductor cord connected with said manually portable unit and containing the circuit connections for said intermittently closing switch device and said manually operable switch means.

WILLIAM M. PAUL.

REFERENCES CITED

The following references are of record in the file of this patent:

UNITED STATES PATENTS

| Number | Name | Date |
| --- | --- | --- |
| 418,411 | Holmes | Dec. 31, 1889 |
| 711,635 | Lavens | Oct. 21, 1902 |
| 1,064,461 | Dyer | June 10, 1913 |
| 1,214,088 | Skinner | Jan. 30, 1917 |